United States Patent
Lee et al.

(10) Patent No.: US 12,431,777 B2
(45) Date of Patent: Sep. 30, 2025

(54) LINEAR POWER GENERATION DEVICE INCLUDING OUTPUT INCREASING ELEMENT

(71) Applicant: LGS CORPORATION Co., Ltd., Gwangmyeong-si (KR)

(72) Inventors: Chul Kyu Lee, Gunpo-si (KR); Myoung Soo Cho, Gunpo-si (KR)

(73) Assignee: LGS CORPORATION Co., Ltd., Gwangmyeong-si (KR)

( * ) Notice: Subject to any disclaimer, the term of this patent is extended or adjusted under 35 U.S.C. 154(b) by 288 days.

(21) Appl. No.: 18/144,245

(22) Filed: May 8, 2023

(65) Prior Publication Data
US 2024/0266934 A1 Aug. 8, 2024

(30) Foreign Application Priority Data
Feb. 7, 2023 (KR) .................. 10-2023-0016167

(51) Int. Cl.
*H02K 35/02* (2006.01)
*H02K 1/18* (2006.01)
*H02K 7/18* (2006.01)

(52) U.S. Cl.
CPC .............. *H02K 35/02* (2013.01); *H02K 1/18* (2013.01); *H02K 7/1876* (2013.01)

(58) Field of Classification Search
CPC ......... H02K 35/02; H02K 1/18; H02K 7/1876
USPC .... 310/12.12, 49.32, 154.42, 154.48, 156.07
See application file for complete search history.

(56) References Cited

FOREIGN PATENT DOCUMENTS

| JP | S5845514 Y2 | * | 10/1983 | |
| JP | H07335434 A | * | 12/1995 | |
| JP | 3983294 B2 | * | 9/2007 | ............ F04B 35/045 |
| KR | 20-0121687 Y1 | | 8/1998 | |
| KR | 20-0131611 Y1 | | 4/1999 | |
| KR | 10-0907723 B1 | | 7/2009 | |
| KR | 10-2022-0097233 A | | 7/2022 | |
| WO | WO-9531851 A1 | * | 11/1995 | ............... H02K 3/26 |

* cited by examiner

*Primary Examiner* — Jose A Gonzalez Quinones
(74) *Attorney, Agent, or Firm* — Revolution IP, PLLC

(57) ABSTRACT

Disclosed is a linear power generation device that exhibits reduced vibration and noise, thereby having excellent quietness, and that concentrates a magnetic flux on a driving body, thereby greatly increasing the output thereof and improving the overall operation efficiency thereof, wherein the linear power generation device includes a stator yoke housing, a stator coil disposed in the stator yoke housing, a linear driving magnet body configured to perform forward-backward movement operation due to interaction with the stator coil using a generated magnetic flux, and a linear driving body output increasing element disposed on one side of the interior of the stator yoke housing and configured to concentrate a magnetic flux of the linear driving magnet body on the stator coil while preventing leakage of the magnetic flux to increase the driving force of the linear driving magnet body.

2 Claims, 7 Drawing Sheets

LINEAR POWER GENERATION DEVICE INCLUDING OUTPUT INCREASING ELEMENT

BACKGROUND OF THE INVENTION

Field of the Invention

The present invention relates to a linear power generation device including an output increasing element, and more particularly to a linear power generation device including an output increasing element, which exhibits reduced vibration and noise, thereby having excellent quietness, and which concentrates a magnetic flux on a driving body, thereby greatly increasing the output thereof and improving the overall operation efficiency thereof.

Description of the Related Art

During the industrial revolution, a steam engine was developed as the first power generation device. Thereafter, use of crude oil has led to development of an internal combustion engine using petrol and gas as raw materials. At the present time, the internal combustion engine is still mainly used as a power generation device for vehicles. However, the internal combustion engine has disadvantages of large combustion noise and emissions being generated due to the characteristics thereof. Therefore, the internal combustion engine is very limitedly used as a power generation device in general industrial settings.

A motor is used as an alternative to the internal combustion engine in order to solve the above-described problems with the internal combustion engine. Since the motor uses electricity as an energy source, the motor has advantages in that noise is very low and emissions are not generated compared to the internal combustion engine. Therefore, the motor is generally used as a power generation device in most industrial settings.

In general, a motor is a device that converts electrical energy into mechanical energy, i.e. rotational motion. In many industrial settings, various mechanical devices capable of producing linear power, rather than rotational power, are required. When a general motor is used, a separate mechanism for converting rotational motion into linear motion is necessary, which makes the structure of a power generation device including a motor complicated and increases the size thereof. As a result, a space for installation of the power generation device may be limited.

Therefore, a linear motor capable of directly converting electrical energy into linear motion has been developed. The linear motor has a configuration obtained by laying out components of a general rotary motor in a plane. That is, since coils and magnets are disposed in a straight line, the linear motor directly converts electrical energy into linear motion without converting electrical energy into rotational motion. As such, since a process of converting rotational motion into linear motion is not necessary, the linear motor has excellent operation efficiency.

In other words, unlike a general motor performing rotational motion, the linear motor directly performs linear motion, and accordingly has a high operation speed and is precisely controlled in position.

The aforementioned linear motor will now be described in more detail through comparison with a rotary motor. Because the rotary motor performs infinite continuous motion in a rotational direction, when it is intended to obtain linear power from a device equipped with the rotary motor, various mechanical conversion devices for converting rotational motion into linear motion, such as a link, a screw, a chain, and a gear system, are required. As a result, there are shortcomings that energy loss occurs due to friction and noise is inevitably generated.

In contrast, since the linear motor directly generates linear power, no mechanical conversion device is required. Accordingly, the linear motor has advantages in that the structure thereof is simple and energy loss or noise is minimized or prevented.

In other words, the linear motor has a simple mechanical structure, is easy to miniaturize, has a high moving speed, generates a large driving force, and is precisely controlled in position. In addition, a driving unit of the linear motor is not worn by friction, whereby noise is low, and semi-permanent use is possible.

However, manufacture of the above-described linear motor requires electromagnetic field and heat dissipation analysis technology for optimal design of high-efficiency products, structural design and manufacturing technology for units suitable for machines equipped with linear motors, dedicated driver manufacturing technology for high-power linear motors, performance evaluation technology for analysis of the characteristics of linear motors, and control technology for stable driving characteristics, but research on linear motors is still insufficient. Further, driving of linear motors requires considerable know-how, and the price thereof is high.

Meanwhile, a voice coil motor, which is a type of linear motor, is generally used in devices requiring high precision and fast response.

FIG. 1 is a schematic diagram for explaining the configuration of a conventional voice coil motor and a state of force generation in one direction, FIG. 2 is a schematic diagram for explaining the configuration of the conventional voice coil motor and a state of force generation in the opposite direction, and FIG. 3 is a diagram for explaining problems with the conventional voice coil motor.

As shown in FIG. 1, in the conventional voice coil motor, when power is applied to a stator coil in one direction (a forward direction), current interaction occurs between the magnetic flux of a driving magnet body and the stator coil, and force is generated in the stator coil. In this case, since the stator coil is fixed, the driving magnet body moves in the forward direction due to repulsive force.

On the contrary, when power is applied to the stator coil in the opposite direction (a backward direction), the driving magnet body moves in the backward direction.

However, in the conventional voice coil motor, the magnetic flux is widely distributed in both edge portions of the stator coil, and magnetic flux distribution at a force generation point is also wide. Therefore, about 20% of the magnetic flux of the driving magnet body leaks, and thus the output of the conventional voice coil motor is reduced.

RELATED ART DOCUMENT

Patent Document (Patent Document 0001) Korean Patent Laid-Open Publication No. 10-2022-0097233 (published on Jul. 7, 2022)
(Patent Document 0002) Korean Patent Registration No. 10-0907723 (registered on Jul. 14, 2009)
(Patent Document 0003) Korean Utility Model Registration No. 20-0131611 (registered on Apr. 15, 1999)

(Patent Document 0004) Korean Utility Model Registration No. 20-0121687 (registered on Aug. 1, 1998)

SUMMARY OF THE INVENTION

The present invention has been made in an effort to solve the above-described problems associated with the related art, and it is an object of the present invention to provide a linear power generation device that exhibits reduced vibration and noise, thereby having excellent quietness, and that concentrates a magnetic flux on a driving body, thereby greatly increasing the output thereof and improving the overall operation efficiency thereof.

However, the objects to be accomplished by the present invention are not limited to the above-mentioned objects, and other objects not mentioned herein will be clearly understood by those skilled in the art from the following description.

In accordance with the present invention, the above and other objects can be accomplished by the provision of a linear power generation device including a stator yoke housing, a stator coil disposed in the stator yoke housing, a linear driving magnet body configured to perform forward-backward movement operation due to interaction with the stator coil using a generated magnetic flux, and a linear driving body output increasing element disposed on one side of the interior of the stator yoke housing and configured to concentrate a magnetic flux of the linear driving magnet body on the stator coil while preventing leakage of the magnetic flux to increase a driving force of the linear driving magnet body.

According to the present invention, the stator coil may include a pair of coil portions and a coil holding portion fixed to the inner surface of the stator yoke housing and configured to isolate the pair of coil portions from each other and to hermetically seal the pair of coil portions. Each of the pair of coil portions may be disposed in a respective one of sealed spaces isolated from each other in the coil holding portion.

According to the present invention, the coil holding portion may be made of aluminum, and the pair of coil portions may be made of copper.

According to the present invention, the linear driving magnet body may include a linear driving main body disposed in the center portion of the stator yoke housing so as to be linearly movable forwards and backwards, the linear driving main body being configured to allow an interlocking linear driving body transferring linear power to the outside to be coupled thereto, and a permanent magnet disposed on the linear driving main body such that a relatively long portion of the permanent magnet faces the stator coil.

According to the present invention, the permanent magnet of the linear driving magnet body may be disposed such that polarities of both end portions of the permanent magnet are oriented in a linear movement direction, and the linear driving body output increasing element may include permanent magnets disposed so as to be spaced a predetermined distance from both ends of the linear driving magnet body.

According to the present invention, the permanent magnet of the linear driving magnet body may be disposed such that polarities of both end portions of the permanent magnet are oriented in a linear movement direction, and the linear driving body output increasing element may include permanent magnets disposed in a linear movement direction of the linear driving magnet body while being spaced apart from the linear driving magnet body by a forward-backward moving distance of the linear driving magnet body.

According to the present t invention, each of the permanent magnets of the linear driving body output increasing element and the permanent magnet of the linear driving magnet body may be disposed such that the same polarities thereof face each other.

BRIEF DESCRIPTION OF THE DRAWINGS

The above and other objects, features, and other advantages of the present invention will be more clearly understood from the following detailed description taken in conjunction with the accompanying drawings, in which.

DETAILED DESCRIPTION OF THE INVENTION

Figure 1:
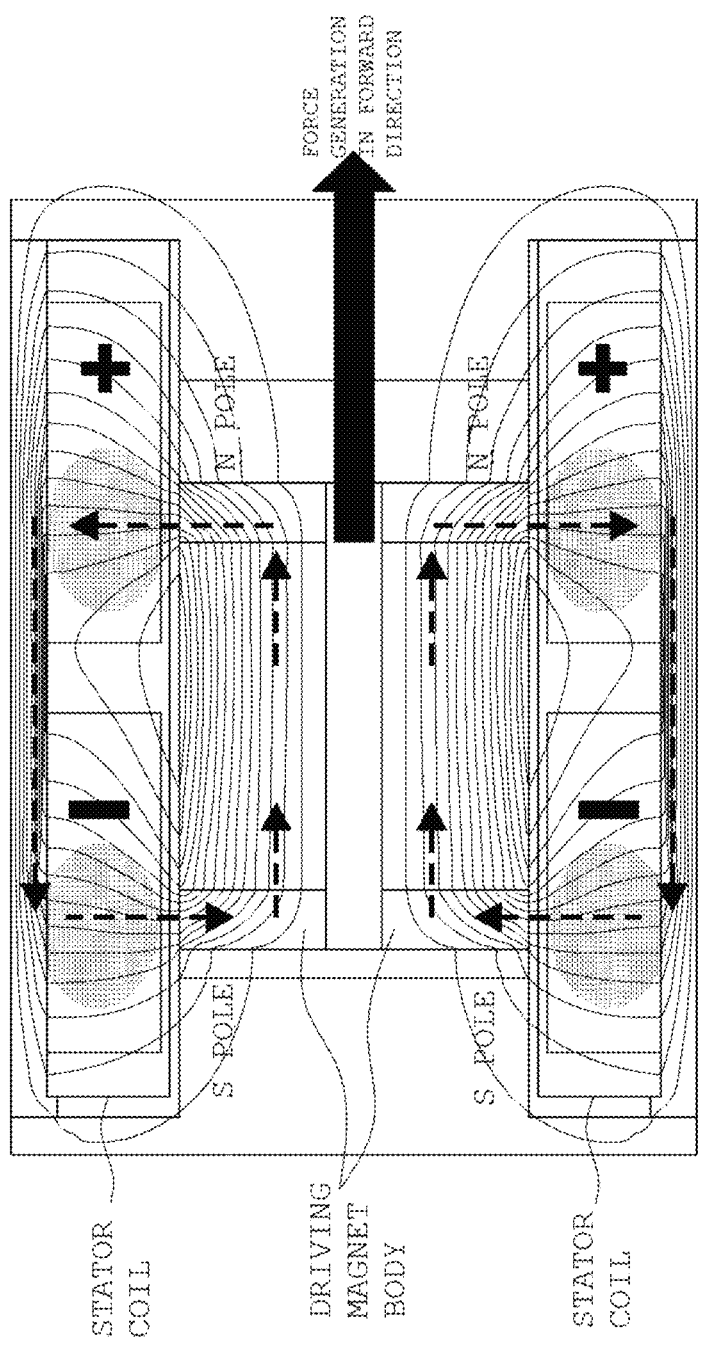
FIG. 1 is a schematic diagram for explaining the configuration of a conventional voice coil motor and a state of force generation in one direction.
Figure 2:
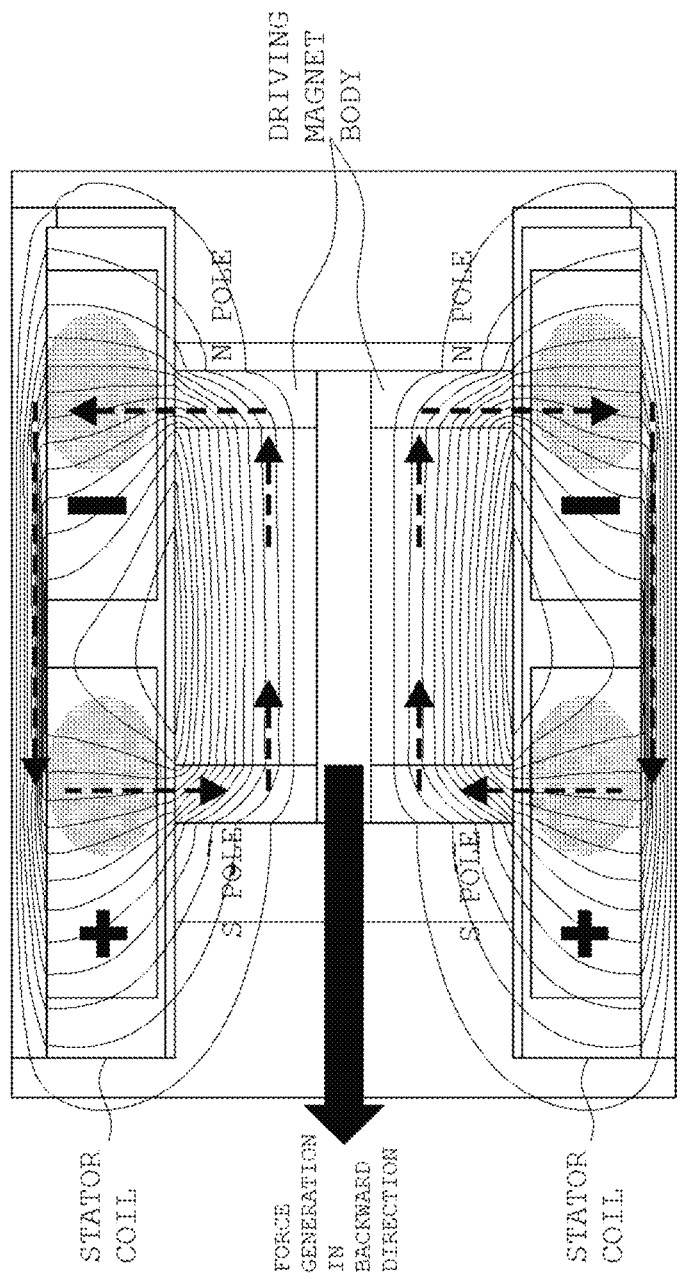
FIG. 2 is a schematic diagram for explaining the configuration of the conventional voice coil motor and a state of force generation in the opposite direction.

The above and other objects, features, and other advantages of the present invention will be more clearly understood from the following detailed description taken in conjunction with the accompanying drawings.

The present invention will now be described more fully hereinafter with reference to the accompanying drawings, in which various embodiments are shown. The examples, however, may be embodied in many different forms and should not be construed as being limited to the embodiments set forth herein. It is to be understood that the present invention covers all modifications, equivalents, and alternatives falling within the scope and spirit of the present invention.

It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

The terminology used herein is for the purpose of describing particular embodiments only and is not intended to be limiting of exemplary embodiments of the invention. As used herein, the singular forms are intended to include the plural forms as well, unless the context clearly indicates otherwise. It will be further understood that the terms "include" or "have", when used herein, specify the presence of stated features, integers, steps, operations, elements, components, or combinations thereof, but do not preclude the presence or addition of one or more other features, integers, steps, operations, elements, components, or combinations thereof.

In addition, it should be noted that when reference numerals are assigned to the elements of the drawings, the same elements are denoted by the same reference numerals even when they are depicted in different drawings, and a duplicate description thereof will be omitted. In the following description of the present invention, a detailed description of known functions and configurations incorporated herein will be omitted when it may make the subject matter of the present invention rather unclear.

Hereinafter, a linear power generation device according to a preferred embodiment of the present invention will be described in detail with reference to the accompanying drawings.

Figure 4:
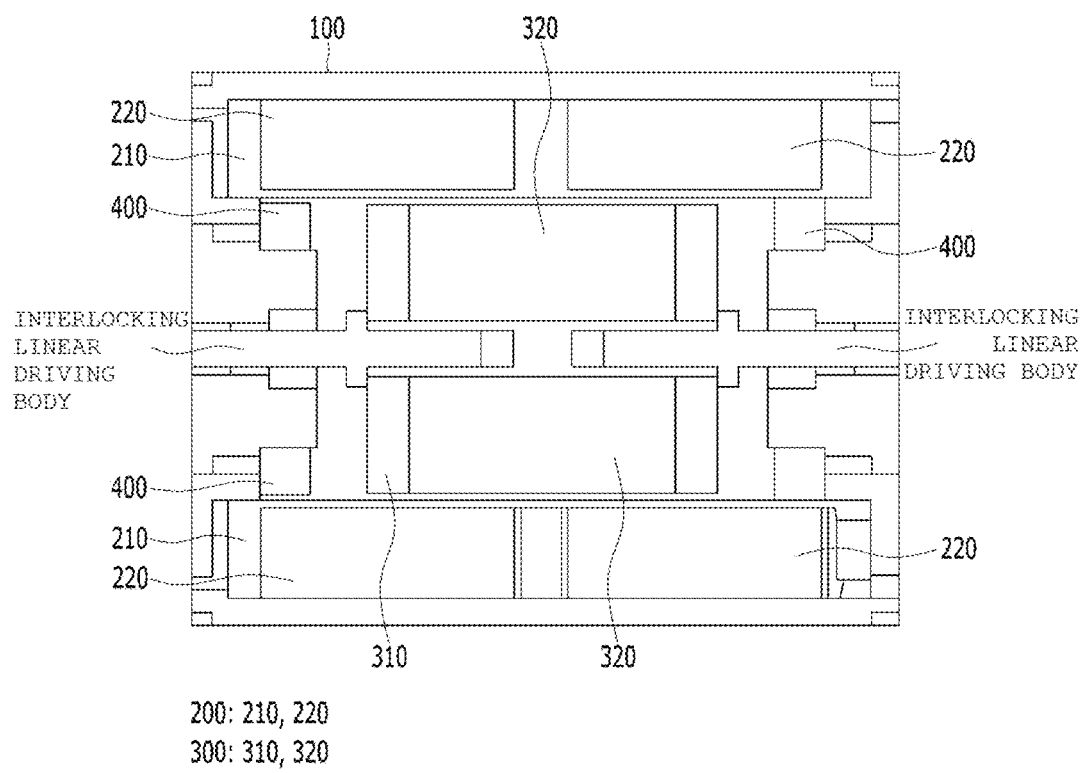
FIG. 4 is a cross-sectional view schematically showing the internal configuration of a linear power generation device according to the present invention.
Figure 5:
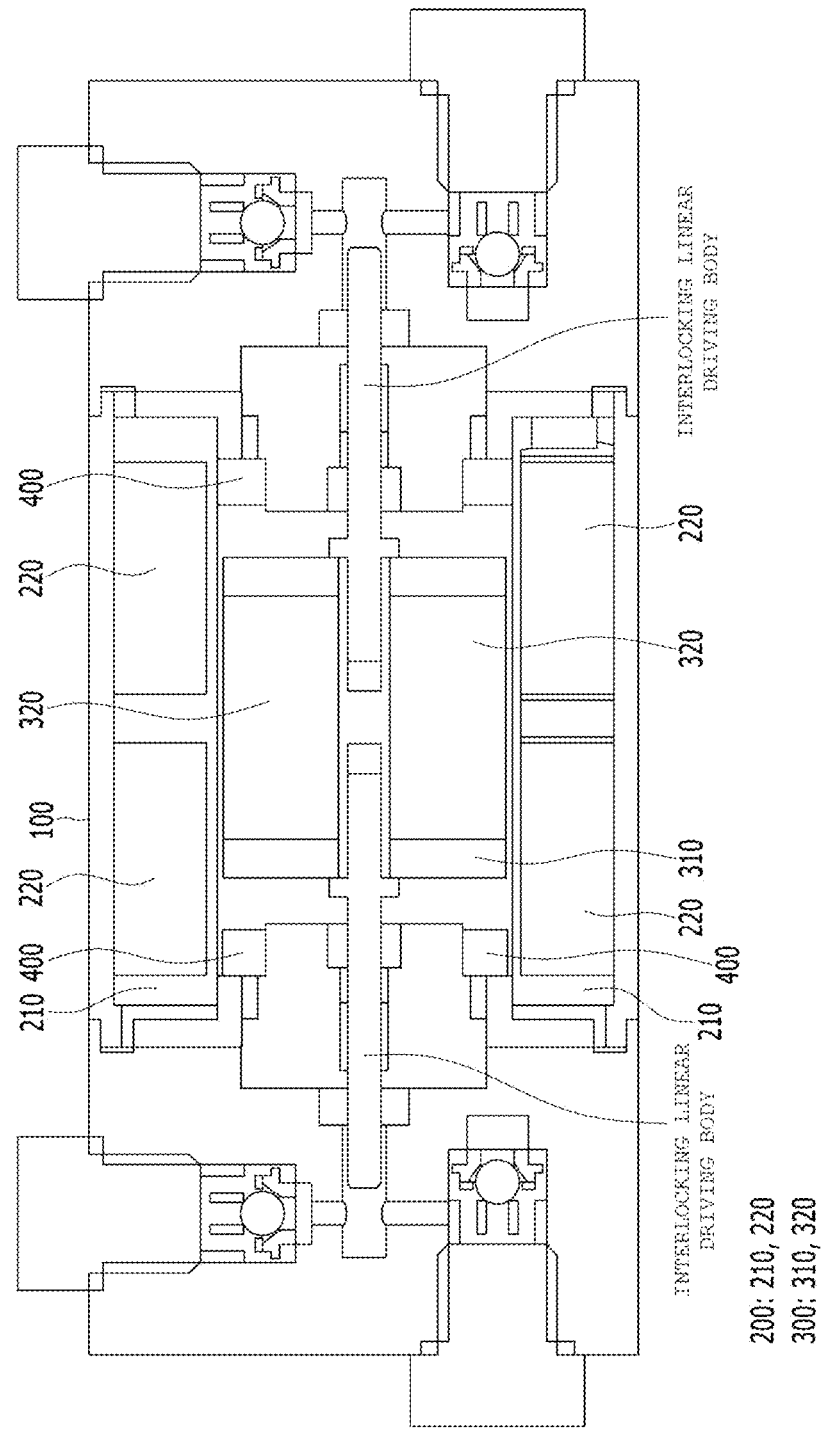
FIG. 5 is a configuration view showing an example in which the linear power generation device according to the present invention is applied to a plunger pump.
Figure 6:
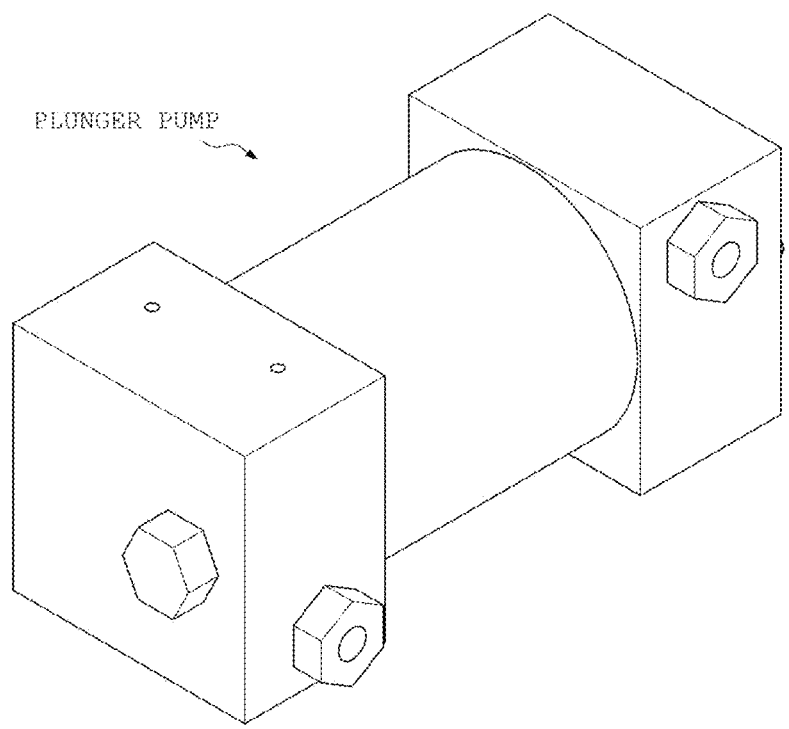
FIG. 6 is a perspective view showing the plunger pump including the linear power generation device according to the present invention.

FIG. 4 is a cross-sectional view schematically showing the internal configuration of a linear power generation device according to the present invention, FIG. 5 is a configuration view showing an example in which the linear power generation device according to the present invention is applied to a plunger pump, and FIG. 6 is a perspective view showing the plunger pump including the linear power generation device according to the present invention.

As shown in FIGS. 4 and 5, the linear power generation device according to the present invention broadly includes a stator yoke housing 100, a stator coil 200, a linear driving magnet body 300, and a linear driving body output increasing element 400.

In detail, as shown in FIGS. 4 and 5, the stator yoke housing 100 is formed in a predetermined shape. The stator coil 200 is provided in a pair, and the pair of stator coils 200 is disposed on the inner surface of the stator yoke housing 100. The pair of stator coils 200 interacts with the linear driving magnet body 300 using a magnetic flux generated by electric power input from the outside to cause the linear driving magnet body 300 to generate linear power (linear motion). The linear driving magnet body 300 is disposed in the stator yoke housing 100, and performs forward-backward movement operation or linear driving operation due to interaction with the stator coils 200 using the generated magnetic flux. The linear driving body output increasing element 400 is disposed on one side of the interior of the stator yoke housing 100, and concentrates the magnetic flux of the linear driving magnet body 300 on the stator coils 200 while preventing leakage of the magnetic flux, thereby increasing the output of the linear driving magnet body 300.

The stator yoke housing 100 is formed so as to hermetically seal the stator coils 200 and to stably fix the stator coils 200. The stator yoke housing 100 is made of an electrically conductive material (e.g. iron) to provide a magnetic path for smooth movement of the magnetic flux of the linear driving magnet body 300.

As illustrated in FIGS. 5 and 6, the stator yoke housing 100 may be formed in a cylindrical shape. However, the stator yoke housing 100 may be formed in any of various shapes, so long as the stator yoke housing 100 has an inner space in which the linear driving magnet body 300 is capable of moving linearly, hermetically seals the stator coils 200, and ensures smooth interaction between the stator coils 200 and the linear driving magnet body 300.

In addition, the stator coils 200 are disposed on the inner surface of the stator yoke housing 100. The stator coils 200 are components that interact with the linear driving magnet body 300 using a magnetic flux generated by electric power input from the outside to cause the linear driving magnet body 300 to generate linear power (linear motion).

Each of the pair of stator coils 200 includes a pair of coil portions 220 and a coil holding portion (or a coil bobbin) 210 fixed to the inner surface of the stator yoke housing 100 and formed so as to isolate the pair of coil portions 220 from each other and to hermetically seal the pair of coil portions 220. Each of the pair of coil portions 220 is disposed in a respective one of sealed spaces isolated from each other in the coil holding portion 210.

For example, the coil holding portion 210 is made of aluminum, and the coil portions 220 are made of copper.

In addition, the linear driving magnet body 300 is provided so as to be linearly movable inside the pair of stator coils 200. The linear driving magnet body 300 is a component that performs forward-backward movement operation or linear driving operation due to interaction with the stator coils 200 using the generated magnetic flux.

In detail, the linear driving magnet body 300 includes a linear driving main body 310 provided so as to be linearly movable forwards and backwards relative to the coil holding portions 210 of the pair of stator coils 200 and a permanent magnet 320 disposed on the linear driving main body 310 such that a relatively long portion thereof faces the stator coils 200.

The linear driving main body 310 of the linear driving magnet body 300 serves to provide a magnetic path for smooth movement of the magnetic flux of the permanent magnet 320 and to allow the magnetic flux to be directed toward the stator coils 200. The linear driving main body 310 may be made of, for example, iron.

An interlocking linear driving body is coupled to the linear driving main body 310 to transfer the linear driving force of the linear driving main body 310 to the outside.

For example, when the linear power generation device of the present invention is applied to a plunger pump, the interlocking linear driving body may be coupled to a piston of the plunger pump to generate pressure of the pump through reciprocating linear motion.

In addition, the permanent magnet 320 of the linear driving magnet body 300 is a permanent magnet made of, for example, neodymium.

The permanent magnet 320 is disposed such that the polarities (the positive (+) polarity and the negative (−) polarity) of both end portions thereof are oriented in the linear movement direction.

In addition, the linear driving body output increasing element 400 is disposed on one side of the interior of the stator yoke housing 100. The linear driving body output increasing element 400 is a component that concentrates the magnetic flux of the linear driving magnet body 300 on the stator coils 200 while preventing leakage of the magnetic flux, thereby increasing the output of the linear driving magnet body 300.

The linear driving body output increasing element 400 may be implemented as permanent magnets, which are disposed so as to be spaced a predetermined distance from both ends of the linear driving magnet body 300 and are made of neodymium.

Preferably, the permanent magnets as the linear driving body output increasing element 400 are spaced a predetermined distance from the linear driving magnet body 300 in the linear movement direction so that the forward-backward moving distance (the moving stroke) of the linear driving magnet body 300 is secured.

In addition, each of the permanent magnets and the permanent magnet 320 of the linear driving magnet body 300 are disposed such that the same polarities thereof face each other.

The above-described linear driving body output increasing element 400 has the following operational effects.

First, the magnetic flux of the permanent magnet 320 of the linear driving magnet body 300 is concentrated on the stator coils 200 through the linear driving main body 310, whereby output may be increased.

Second, the magnetic flux generated by the permanent magnet 320 of the linear driving magnet body 300 is prevented from leaking, and the leakage magnetic flux is concentrated on the stator coils 200, whereby output may be increased.

Third, during operation of the linear power generation device, when the linear driving magnet body 300 performing forward-backward linear motion closely approaches the linear driving body output increasing element 400, the linear driving body output increasing element 400 may serve as a damper, thereby preventing vibration and noise.

Fourth, when the linear driving magnet body 300 performing reciprocating motion approaches the linear driving body output increasing element 400, the linear driving body output increasing element 400 serves to push and propel the linear driving magnet body 300, thereby increasing output.

The following table shows test results for the case in which the linear driving body output increasing element 400 is present and the case in which the linear driving body output increasing element 400 is absent.

|  | Absence of Linear Driving Body Output Increasing Element | Presence of Linear Driving Body Output Increasing Element | Comparison |
| --- | --- | --- | --- |
| Average Output [N] | 110 | 133 | Increased by 21% |
| Motor Size [mm] | 60 × 68 | 60 × 68 | Size Identical |
| Vibration & Noise | Upper Surface Vibration: 0.9 [mm/s] Side Surface Vibration: 2.5 [mm/s] Noise: 71 [dB] | Upper Surface Vibration: 0.4 [mm/s] Side Surface Vibration: 1.1 [mm/s] Noise: 44 [dB] |  |

Although illustrated in FIGS. 5 and 6 as being applied to the plunger pump, the linear power generation device according to the present invention may also be applied to any of various products requiring a power generation device, such as a linear pump, a linear compressor, a linear blower, or a linear valve.

Figure 3:
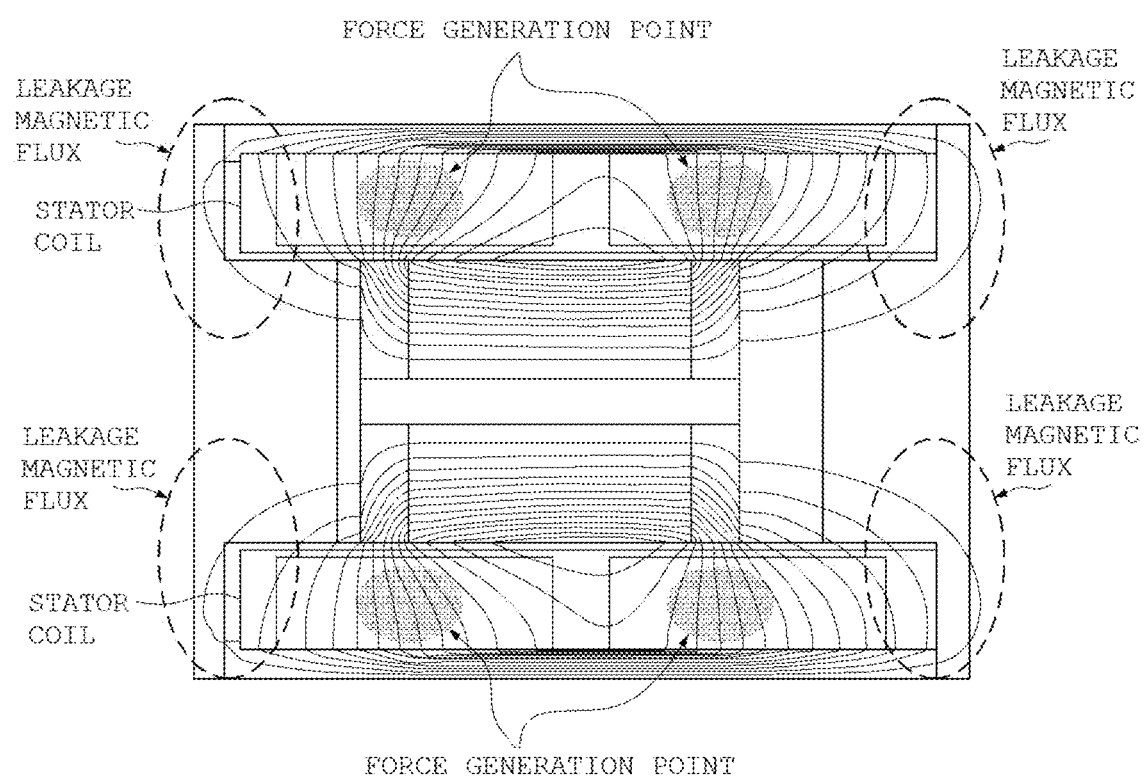
FIG. 3 is a diagram for explaining problems with the conventional voice coil motor.
Figure 7:
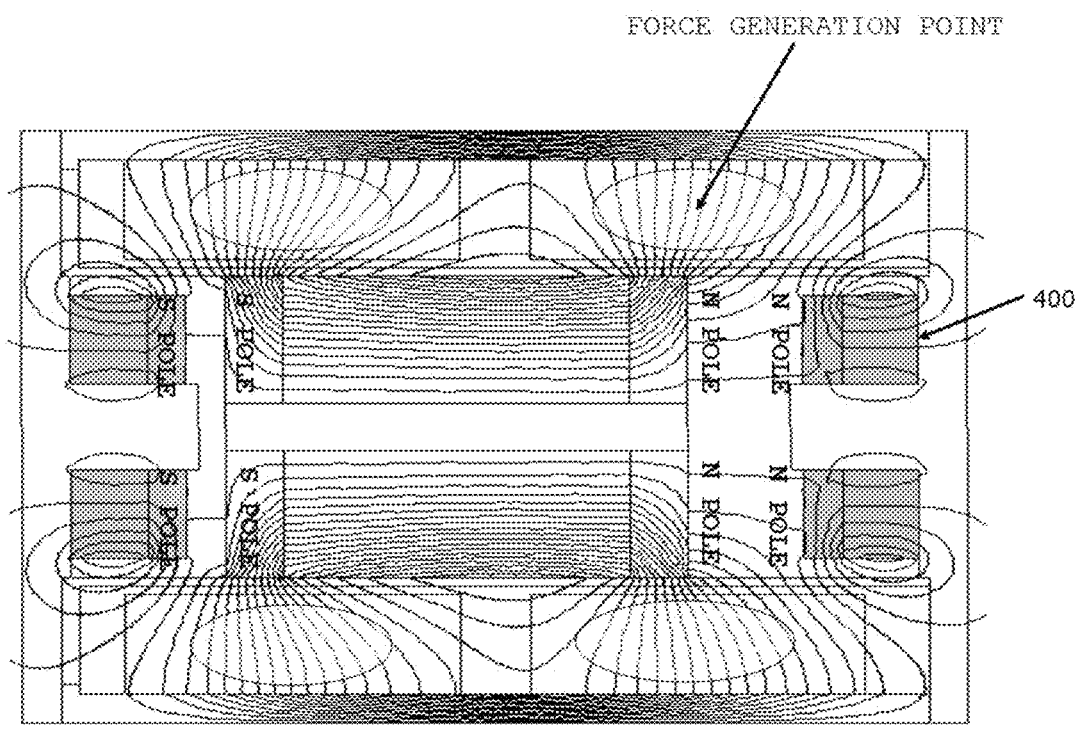
FIG. 7 is a diagram for explaining the effects of the linear power generation device according to the present invention.

FIG. 7 is a diagram for explaining the effects of the linear power generation device according to the present invention compared to the conventional art shown in FIG. 3. Referring to FIG. 7, by virtue of the output increasing element, leakage of the magnetic flux may be reduced, and the magnetic flux may be concentrated on the stator coils and may flow to force generation points.

The linear power generation device according to the present invention configured as described above concentrates the magnetic flux on force generation points, thereby greatly increasing the output of the linear driving body and improving the overall operation efficiency thereof, and exerts a damping action for the linear driving body during linear motion of the linear driving body, thereby reducing vibration and noise and thus having excellent quietness.

As is apparent from the above description, the linear power generation device according to the present invention has the following effects.

First, magnetic flux is concentrated on force generation points, whereby the output of the linear driving body may be greatly increased, and the overall operation efficiency thereof may be improved.

Second, it is possible to exert a damping action for the linear driving body during linear motion of the linear driving body, whereby vibration and noise may be reduced, and thus excellent quietness may be ensured.

However, the effects achievable through the present invention are not limited to the above-mentioned effects, and other effects not mentioned herein will be clearly understood by those skilled in the art from the above description.

While the present invention has been particularly shown and described with reference to exemplary embodiments thereof, these embodiments are only proposed for illustrative purposes, and do not restrict the present invention, and it will be apparent to those skilled in the art that various changes in form and detail may be made without departing from the essential characteristics of the embodiments set forth herein. For example, respective configurations set forth in the embodiments may be modified and applied. Further, differences in such modifications and applications should be construed as falling within the scope of the present invention as defined by the appended claims.

What is claimed is:

1. A linear power generation device comprising:
   a stator yoke housing;
   a stator coil disposed in the stator yoke housing;
   a linear driving magnet body configured to perform forward-backward linear movement due to interaction with the stator coil via a generated magnetic flux; and
   a linear driving body output increasing element disposed on one side of an interior of the stator yoke housing, the linear driving body output increasing element being configured to concentrate a magnetic flux of the linear driving magnet body on the stator coil while preventing leakage of the magnetic flux to increase a driving force of the linear driving magnet body,
   wherein the stator coil comprises:
      a pair of coil portions formed adjacent to an inner surface of the stator yoke housing; and
      a coil holding portion fixed to the inner surface of the stator yoke housing, the coil holding portion being configured to separate and seal the pair of coil portions,
   wherein the linear driving magnet body comprises:
      a linear driving main body provided at a central portion of the stator yoke housing so as to be linearly movable forwards and backwards, the linear driving main body being configured to allow an interlocking linear driving body that transfers linear power to the outside to be coupled thereto; and
      a permanent magnet provided on the linear driving main body such that a portion of the permanent magnet having a relatively long length face stator coil,
   wherein the magnet of the linear driving magnet body is disposed such that polarities of both end portions of the permanent magnet are oriented in a linear movement direction,
   wherein the linear driving body output increasing element comprises permanent magnets arranged so as to be spaced a predetermined distance from both ends of the linear driving magnet body,
   wherein the permanent magnets of the linear driving body output increasing element are disposed such that the same polarity as that of the permanent magnet of the linear driving magnet body faces the permanent magnet of the linear driving magnet body, wherein the stator yoke housing is made of an electrically conductive material and is configured to stably fix the stator coil while enclosing the stator coil, wherein each of the pair of coil portions is oriented in the linear movement direction and has a length that is at least half of a length of the stator yoke housing, wherein the linear driving main body is positioned between the permanent magnet and the linear driving body output increasing element such that the permanent magnet does not directly face the linear driving body output increasing element, wherein the pair of coil portions and the linear driving body output increasing element are arranged to overlap each other in the vertical direction when viewed in cross-section, wherein the interlocking linear driving body coupled to the linear driving main body transmits the linear driving force of the linear driving main body to the outside to drive an external ower device.

2. The linear power generation device according to claim 1, wherein the coil holding portion is made of aluminum, and the pair of coil portions are made of copper.

* * * * *